R. I. HILLIARD.
VALVE.
APPLICATION FILED AUG. 31, 1909.
950,533.
Patented Mar. 1, 1910.
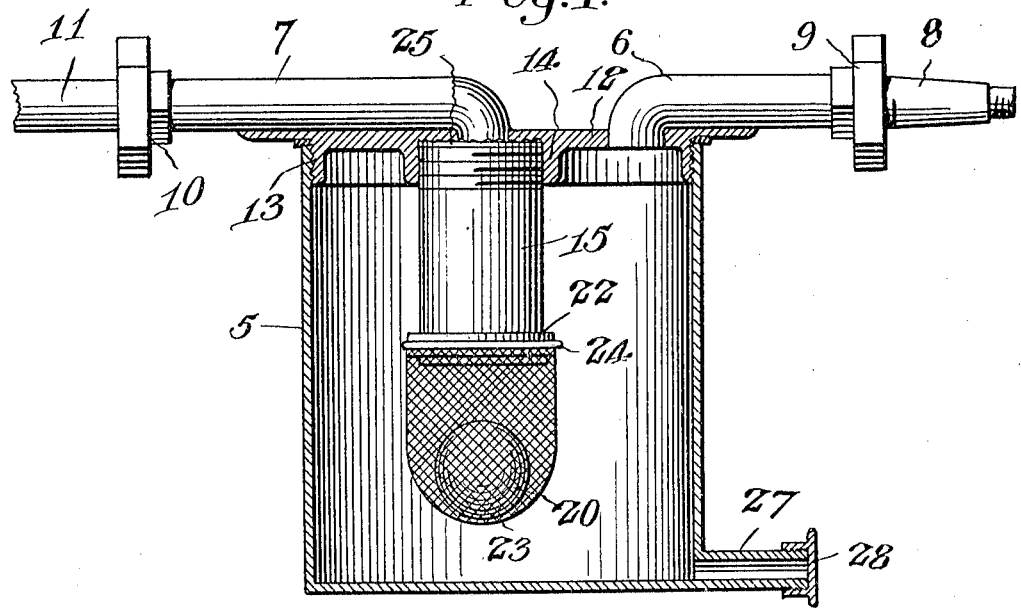
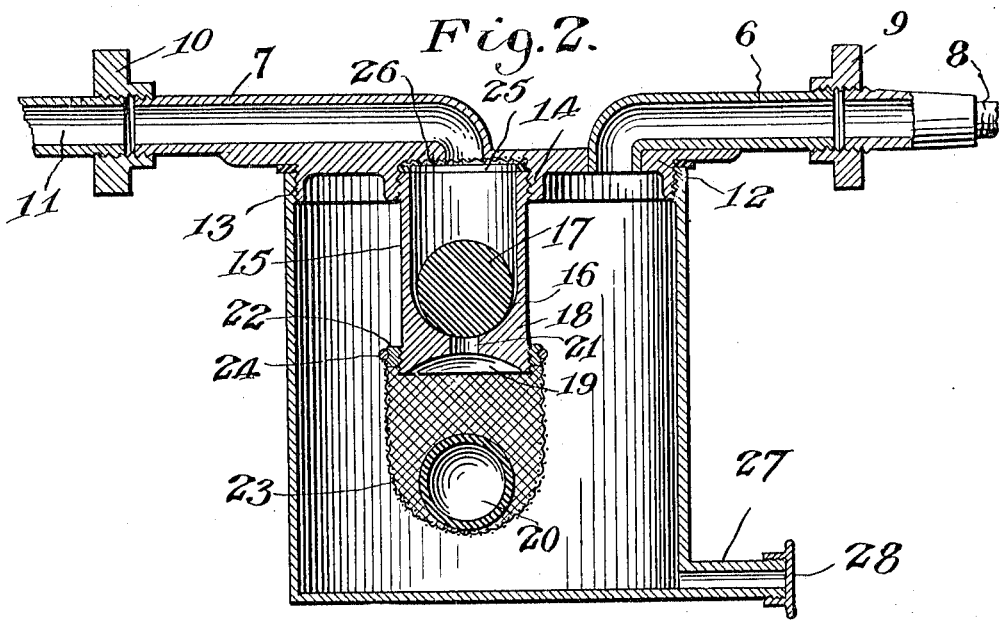
Witnesses:
Joe. P. Walker.
E. M. Ricketts.
Inventor
Richard I. Hilliard
By Watson E. Coleman
Attorney

UNITED STATES PATENT OFFICE.

RICHARD I. HILLIARD, OF ATLANTIC CITY, NEW JERSEY.

VALVE.

950,533. Specification of Letters Patent. Patented Mar. 1, 1910.

Application filed August 31, 1909. Serial No. 515,451.

*To all whom it may concern:*

Be it known that I, RICHARD I. HILLIARD, a citizen of the United States, residing at Atlantic City, in the county of Atlantic and State of New Jersey, have invented certain new and useful Improvements in Valves, of which the following is a specification, reference being had to the accompanying drawings.

This invention relates to valves and more particularly to a valve of that character commonly known as beer valves and is adapted to be disposed between the air conducting pipe and the beer keg to prevent back pressure of the beer through the air pipe and into the air tank.

The primary object of the present invention is to provide a valve of the above character which is simply constructed, may be inexpensively manufactured and is highly efficient in use.

Another object is to provide a valve which is very positive in its operation and will absolutely prevent the entrance of water into the beer keg, which may have accumulated in the air tank during the use of the beer pump.

A further object is to provide a valve, the various parts of which may be easily disassembled and thoroughly cleaned.

With these and other objects in view the invention consists in the various arrangements and combinations of parts which will be fully described in the accompanying specification and particularly pointed out in the appended claims, wherein like reference characters indicate similar parts.

Figure 1 is a side elevation of the valve, the reservoir being shown in section, and Fig. 2 is a central vertical section.

In dispensing beer, a conducting pipe or tube is vertically positioned in the keg or receptacle and is provided at its upper end with the usual beer faucet. The beer is discharged from the keg through the pipe, by the admission of air thereto, and it is for the purpose of preventing the back pressure of the beer into the air tank that my improved valve has been devised. To this end I provide an air reservoir or chamber 5, preferably cylindrical in form and having inlet and outlet pipes 6 and 7 respectively extending oppositely therefrom. To the inlet pipe one end of the flexible air tube 8 is connected by means of the coupling 9. A similar coupling 10 connects the outlet pipe to a discharge pipe 11 positioned through the bung of the beer keg. The outlet pipe 7 is formed integral with a closure plate 12 which is provided with the annular screw threaded flange 13 and has threaded engagement in the upper end of the reservoir. A central depending flange 14 arranged concentrically with relation to the flange 13 is also formed on the plate 12. This flange is provided with interior screw threads to receive the upper threaded end of the cylindrical valve casing 15.

The upper portion of the valve casing is of tubular formation and is provided with a concave valve seat 16 to receive the spherical valve member 17. The lower end of the solid portion 18 of the valve casing is likewise formed with a concave valve seat 19 to receive the hollow spherical valve member 20. An opening 21 connects the valve seats 17 and 20 and forms a communicating passage to the upper tubular portion of the casing 15. A collar 22 has threaded engagement on the lower end of the casing and carries the reticulated housing 23 in which the ball valve 20 is disposed. It will be noted that the valve 20 is thus normally positioned between the lower end of the casing 15 and the bottom of the reservoir out of engagement in the valve seat 19, thereby allowing the air to enter the opening 21. The housing 23 is secured to the collar 22 by means of a ring or band 24 which engages in a peripheral groove formed in the collar.

In the operation of the valve the air enters the reservoir through the inlet pipe 6 and ascends through the passage 21 in the casing 15, lifting the solid spherical valve member 17 from its seat. The air will then pass around the valve member and out through the pipe 7 into the beer keg. Should the air pipe burst or become disconnected from the inlet pipe, the valve member 17 would be immediately reseated and close the passage 21, thus preventing the entrance of the liquid into the reservoir. If water should enter the reservoir from the air tank, the hollow valve member 20 would be floated into its seat 19 and close the passage 21, whereby the liability of the water being carried into the beer keg will be obviated. A washer 25 is disposed between the upper end of the casing 15 and the outlet pipe 7 and a wire mesh 26 is positioned over the opening therethrough and collects all sediment, thus preventing the same from lodging between the valve member 17 and its seat and conducing to the more efficient operation of the valve. It will be understood that the housing 23 may be formed of wire mesh or any other material which will admit of the free passage of air.

From the foregoing it will be seen that I have provided a very simple air valve which is absolutely positive in its operation and admirably adapted for the purposes in view. The various parts may be readily disassembled and thoroughly and quickly cleansed. The valve would preferably be located at the bung of the beer keg, but it may also be disposed at any desired position in the air conducting pipe.

Many minor modifications may be resorted to without departing from the spirit or sacrificing any of the advantages of my invention and I reserve the right to make such changes as I may deem best within the scope of the claims.

For the purpose of enabling the reservoir 5 to be blown out an outlet or blow-off connection 27 may be provided at a bottom portion of said reservoir inclosed by a screw cap 28.

Having thus described the invention, what is claimed is:

1. In a valve of the class described the combination of a reservoir having an inlet and outlet, an open ended valve casing positioned in the reservoir communicating with the outlet, a valve member normally seated in said casing, said casing having a valve seat formed in its lower end, a communicating passage being formed through said casing between the valve seats, and a second valve member normally positioned below the casing and adapted to be seated in the end thereof at times to close the same, said valve members being independently operated by the entrance of air and water into said reservoir.

2. In a valve of the class described, the combination of a reservoir having an inlet and outlet, a valve casing positioned in said reservoir communicating with the outlet, the lower portion of said casing being solid and formed at its upper and lower ends with a valve seat, said casing having a communicating passage between the valve seats, a valve member normally positioned in the upper valve seat, a second valve member normally positioned below the casing and adapted to be floated into its seat by the entrance of water into the reservoir, the first named valve member being lifted from its seat to permit the flow of air through said valve casing into the outlet, and means for supporting the float valve between its seat and the bottom of said reservoir.

3. In a valve of the class described, the combination with a reservoir, an exhaust pipe integrally formed on the lower end of said reservoir, a closure for the upper open end of said reservoir, an inlet and outlet pipe carried by the closure, a cylindrical valve casing removably carried by the closure and disposed within the reservoir, said casing comprising an upper tubular portion and a lower solid portion, a solid spherical valve member seated in the tubular portion, a valve seat formed in the lower end of the casing, a reticulated housing carried by the casing and extending below the same and a hollow spherical valve member disposed in the housing and adapted to engage in the valve seat at times, said casing having an air passage extending through the solid portion and communicating with the upper tubular portion thereof.

4. An air valve having in combination, a cylindrical reservoir, an inlet pipe communicating with the upper end of the reservoir, an air pipe connected to the inlet pipe, a cover plate removably positioned in the upper open end of the reservoir, an outlet pipe integrally formed with said cover plate, an annular depending screw threaded flange carried by the cover, a cylindrical valve casing having threaded engagement with the flange and positioned in the reservoir, a concave valve seat in the lower end of the casing, a concave valve seat formed between the ends of the casing, a solid spherical valve member normally engaged with the last named valve seat, a hollow spherical valve member disposed below the first named valve seat and adapted to be floated into the seat, said valve casing having a communicating air passage between the valve seats.

5. An air valve having in combination, a cylindrical reservoir, a removable cover plate positioned in the upper open end of the reservoir, an outlet pipe integrally formed with the plate and extending therethrough, an inlet pipe communicating with said reservoir, a valve casing carried by the cover and depending into the reservoir, said casing having an upper tubular portion communicating with the outlet, a washer disposed between the valve casing and the outlet pipe, a wire mesh positioned between the washer and outlet, a solid spherical valve member seated in the tubular portion of the casing, said casing having a lower solid portion and an opening extending vertically therethrough, a collar threaded upon the lower end of the casing, a depending reticulated housing carried by the collar, a hollow spherical valve member disposed in the housing, said valve member being adapted to be seated in the lower end of the valve casing at times to close the opening therein, and a blow off pipe communicating with said reservoir having a closure cap threaded on its outer end.

In testimony whereof I hereunto affix my signature in the presence of two witnesses.

RICHARD I. HILLIARD.

Witnesses:
 ADAM FREUND,
 HENRY FREUND, Jr.